United States Patent [19]

Lapp et al.

[11] Patent Number: 5,250,132
[45] Date of Patent: Oct. 5, 1993

[54] METHOD OF MAKING A COMPOSITE LAMINATE HAVING AN INTERNALLY DAMPED CONSTRAINING LAYER

[75] Inventors: Christy K. Lapp, Sunnyvale, Calif.; Paul D. Grund, Eagan, Minn.

[73] Assignee: Westinghouse Electric Corp., Pittsburgh, Pa.

[21] Appl. No.: 801,563

[22] Filed: Dec. 2, 1991

[51] Int. Cl.$^5$ .................................. B65H 81/00
[52] U.S. Cl. ................................. 156/173; 156/169; 156/175; 248/636; 248/638; 52/309.1; 188/378
[58] Field of Search ................. 428/36.3, 36.4, 34.5; 248/636, 638; 52/309.1; 188/378; 156/169, 172, 173, 175

[56] References Cited

U.S. PATENT DOCUMENTS

| | | | |
|---|---|---|---|
| 3,886,024 | 5/1975 | Chase | 156/294 |
| 4,278,726 | 7/1981 | Wieme | 248/636 X |
| 4,812,348 | 3/1989 | Rau | 428/36.3 X |
| 5,030,490 | 7/1991 | Bronowicki et al. | 428/36.4 |
| 5,087,491 | 2/1992 | Barrett | 428/34.5 |
| 5,108,802 | 4/1992 | Sattinger | 52/309.1 X |

FOREIGN PATENT DOCUMENTS 2111167 6/1983 United Kingdom ............... 428/36.3

OTHER PUBLICATIONS

Sattinger, S. S., "Constrained-Layer Damping Effectiveness On Members Under Vibratory Extensional Loading" ASME Design Engineering Conference, Sep. 10-13, 1985, Cincinnati, Ohio, Scientific Paper No. 84-1J7-DAMPS-P1.

Primary Examiner—Jeff H. Aftergut
Attorney, Agent, or Firm—D. Schron

[57] ABSTRACT

A method of making a composite laminate having an internally damped constraining layer sandwiched between first and second load-bearing members. The constraining layer and load-bearing members are of a filament reinforced resin matrix, with the gelation temperature of the resin matrices of the constraining layer and load-bearing members being different. During a single cure cycle, the temperature of the assembled unit is increased such that one of the resin matrices hardens first while the other hardens at a later point in time and at a higher temperature, with the process ensuring for an adequate bond between the resin matrices and viscoelastic damping layers positioned on either side of the constraining layer members. The constraining layer members are affixed with gaps between them and a compliant tubing is placed within the gaps.

5 Claims, 4 Drawing Sheets

STEP 1

STEP 2

STEP 3

STEP 4

STEP 5

STEP 6

STEP 7

STEP 8

METHOD OF MAKING A COMPOSITE LAMINATE HAVING AN INTERNALLY DAMPED CONSTRAINING LAYER

BACKGROUND OF THE INVENTION

1. Field of the Invention

The invention in general relates to a novel method for making a composite laminate structure and, more particularly, to a structure which has one or more internally embedded vibration damping layers.

2. Background Information

In order to reduce the weight of certain structures, while still maintaining sufficient load-bearing capabilities, extensive use is made of advanced composite materials. Vibration damping of some metallic structures is provided by the structural metallic mass itself, which is no longer available when the structure is formed of a composite material. Accordingly, such composite structure must be provided with a damping arrangement.

One form of advanced damping technique particularly well suited for tubular or box beam structures, for example, is described and claimed in U.S. Pat. No. 5,108,802 assigned to the assignee of the present invention. In that arrangement, the damping is fully encapsulated so as to protect personnel working in the vicinity of the structure from the release of noxious vapors in the event of a fire. Further, the encapsulation protects the internal damping medium from attack by moisture, lubricants oxygen, and the like.

Basically, the aforementioned patent describes a cylindrical structure which has an internal filament-wound constraining layer bonded on the outer and inner surfaces thereof to respective viscoelastic polymer damping layers. The inner damping layer, in turn, is bonded to a filament-wound composite load-bearing member, and the structure is surrounded by an outer composite load-bearing member bonded to the other viscoelastic damping member.

As will be subsequently brought out, the fabrication of such structure is time-consuming and labor-intensive. The present invention provides such structure by a fabrication technique which significantly reduces fabrication time and simplifies the construction thereof.

SUMMARY OF THE INVENTION

A composite laminate having an internally damped constraining layer is made in accordance with the present invention by forming a plurality of composite constraining layer members, each being of a filament reinforced resin matrix having a certain gelation temperature. A first composite load-bearing member is fabricated from a filament reinforced resin matrix system which has a gelation temperature different than the gelation temperature of the resin matrix of the constraining layer members. A first viscoelastic damping layer is applied to the first composite load-bearing member prior to curing, and the previously formed constraining layer members are placed over the viscoelastic layer in a predetermined pattern, which leaves gaps between the applied layers. Prior to curing, the resin matrix of the constraining layer members is still tacky. If the resin matrix of the constraining layer members is of the type which will flow during a subsequent curing, then compliant spacer strips are placed in the gaps between the constraining layer members.

A second viscoelastic damping layer is placed over the constraining layer members, and a second composite load-bearing member is placed over the second viscoelastic damping layer such as by filament winding and is of a filament reinforced resin matrix, and may be of the same resin matrix as that utilized in the first load-bearing member.

The unit thus fabricated is then cured by placing it in an oven and increasing the temperature, with the temperature profile being such as to include first the gelation temperature of the resin matrix of the load-bearing members and, thereafter, the gelation temperature of the resin matrix of the constraining layer members (although this order may be reversed). In order to ensure hardening of the resin matrix in the load-bearing members, its gelation temperature may be held for a predetermined period of time.

DESCRIPTION OF THE PREFERRED EMBODIMENT

Figure 1:
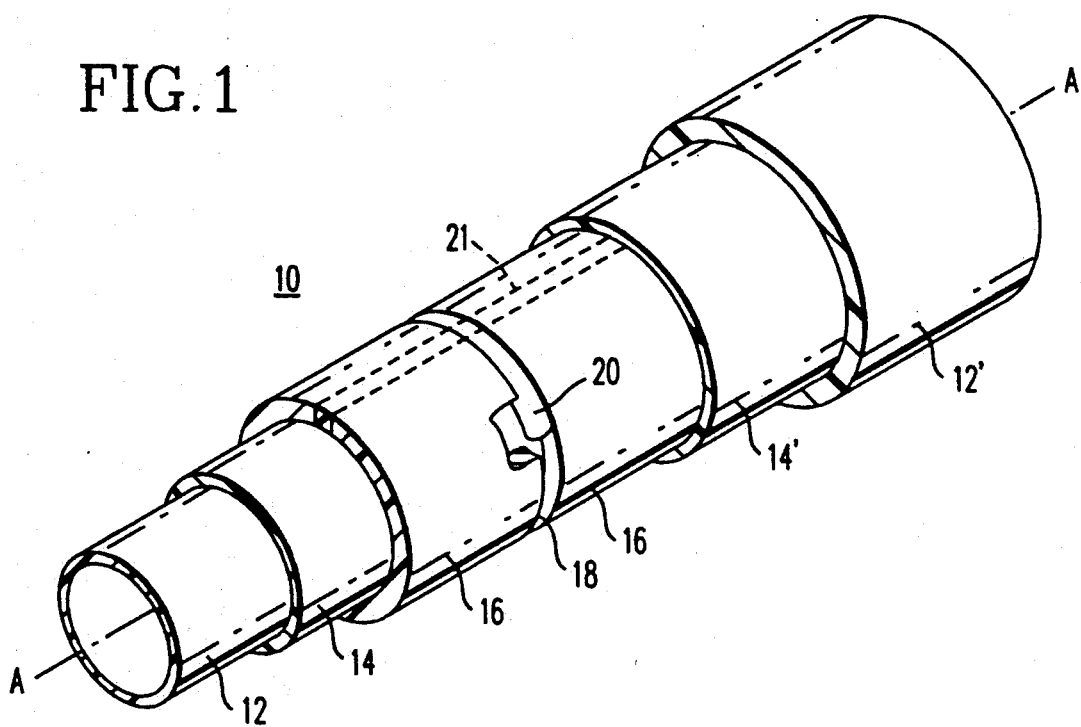
FIG. 1 illustrates an isometric view, with portions broken away, of a composite laminate made in accordance with the present invention.

The composite laminate structure of FIG. 1 is illustrated by way of example as a hollow, right circular cylinder having a longitudinal axis AA, although other structures such as hollow box beams and even non-cylindrical structures, may be fabricated in accordance with the teachings of the present invention.

Structure 10 includes a first composite load-bearing member 12 made of a filament reinforced resin matrix and around which is situated a first viscoelastic damping layer 14.

The structure includes an internally damped constraining layer formed of a plurality of composite constraining layer members 16 separated by gaps 18 occupied by respective compliant spacer strips 20. Although FIG. 1 illustrates the constraining layer members 16 separated axially, they may, depending upon the application of the structure, be also separated circumferentially, as indicated by the dotted lines, in which case a compliant spacer strip 21 would be provided.

Figure 2:
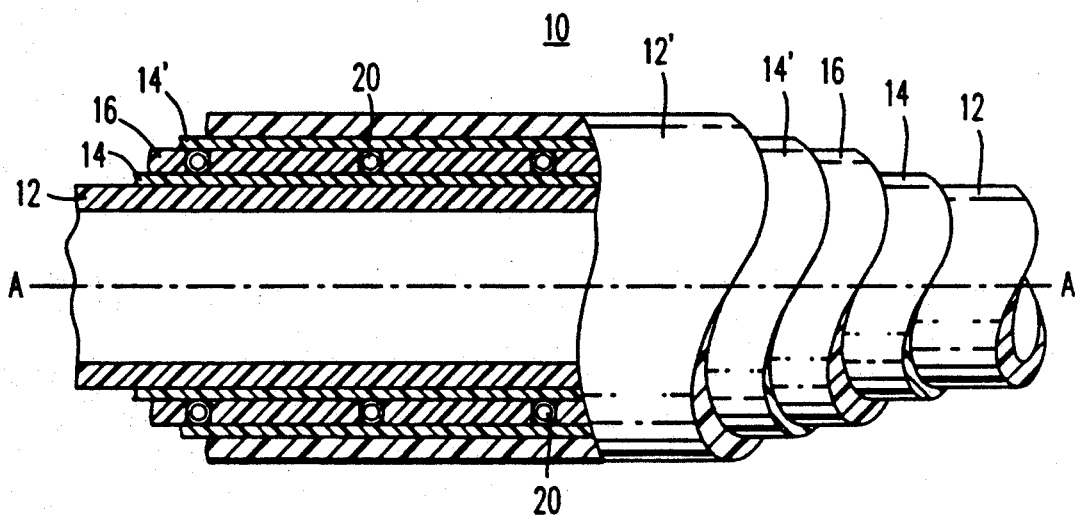
FIG. 2 is an axial, cross-sectional view of the structure of FIG. 1.

A second viscoelastic damping layer 14' is placed over the constraining layer members and spacer strips, and a second or outer composite load-bearing member 12' is applied around the viscoelastic layer 14'. The cross-sectional view of FIG. 2 further illustrates the sandwich arrangement with a plurality of axially positioned, damped constraining layer members 16 separated by compliant spacer strips 20.

Figure 3:
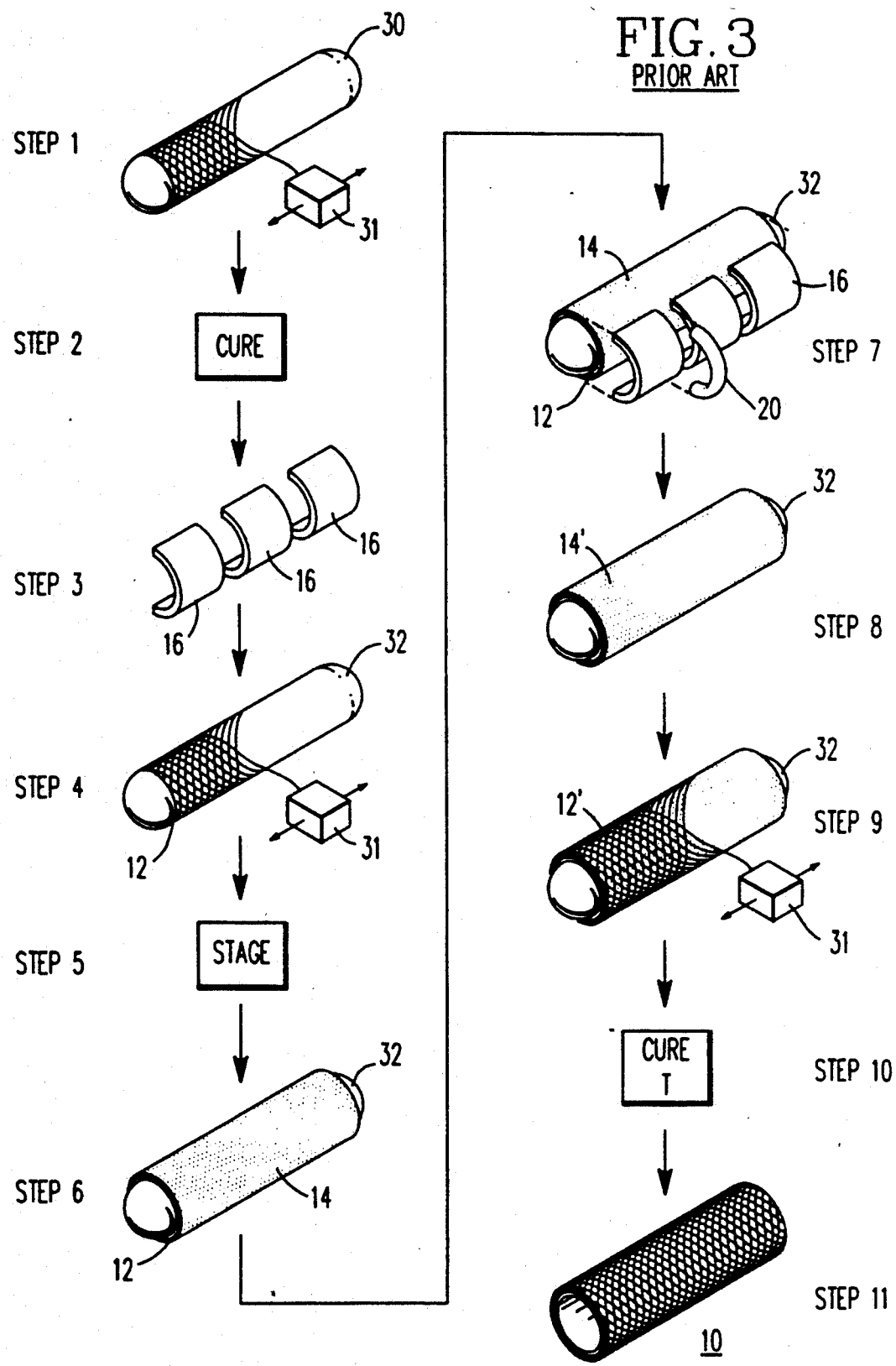
FIG. 3 illustrates the construction of the structure of FIG. 1, in accordance with the prior art.

FIG. 3 illustrates the steps involved in the prior art construction of the composite laminate structure of FIG. 1. In step 1, a filament-wound composite tube is formed on a mandrel 30, by filament winding apparatus 31, to a thickness equivalent to the thickness of the constraining layer 16. Thereafter, the composite tube thus formed is cured, as in step 2, either in the air or in an oven, depending upon the resin matrix utilized. After the cure process, and as illustrated in step 3, a machining operation is performed to cut the cured tube into a plurality of constraining layer members 16.

In step 4, the first or inner load-bearing laminate is formed over another mandrel 32 by filament winding apparatus 31, and is thereafter staged or allowed to gel to a hardened state overnight, as indicated in step 5.

In step 6, the first viscoelastic damping layer 14 is applied to the staged load-bearing laminate 12 by means of an adhesive which is allowed to cure for firm bonding action. The precut constraining layer members 16 are then adhesively applied to the viscoelastic layer 14, as in step 7, and the members 16 are clamped in place until the adhesive cures. Compliant spacing members 20 are placed in the gaps between the constraining layer member 16.

In step 8, the second viscoelastic damping layer 14 is adhesively applied over the constraining layer members 16.

In step 9, the outer load-bearing laminate 12' is filament-wound over the viscoelastic damping layer, and the completed structure, as indicated in step 10, is cured either at room temperature or at an elevated temperature T, depending upon the resin matrix used in the load-bearing members. Since the resin matrix system of the constraining layer members have already been cured, it is only necessary to maintain temperatures below that which would cause the cured resin to soften. Thereafter, as in step 11, the structure is removed from the mandrel and may be prepared for its intended use.

The foregoing manufacturing procedure results in a composite laminate structure 10 which exhibits excellent damping performance, and the damping materials are not exposed but rather are embedded in the walls of the structure. The fabrication is, however, somewhat labor-intensive and requires multiple curing cycles and bonding steps. In addition, when the constraining layer 16 is cut into a plurality of segments, springback can occur whereby the radius of the segment is smaller than the radius of the tube prior to machining. The final segment radius may be difficult to predict since it depends upon several variables such as a laminate thickness, cure temperature, and residual stresses. With the fabrication process of the present invention, such problem is eliminated and the fabrication process is much less labor-intensive.

Figure 4:
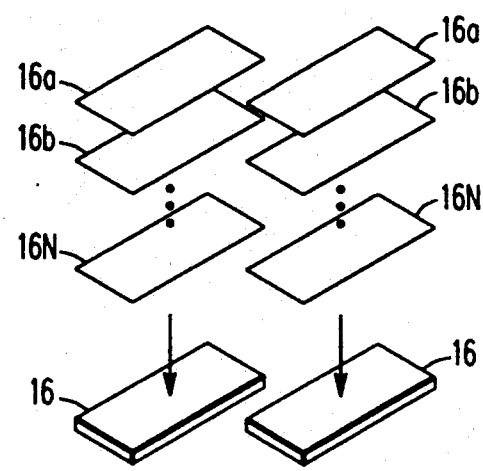
FIG. 4 illustrates the construction of the structure of FIG. 1, in accordance with the present invention.
Figure 4:
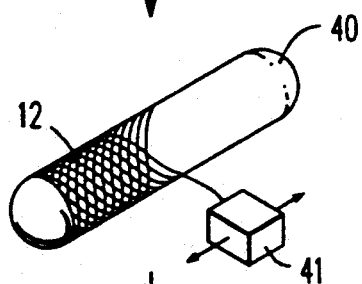
Figure 4:
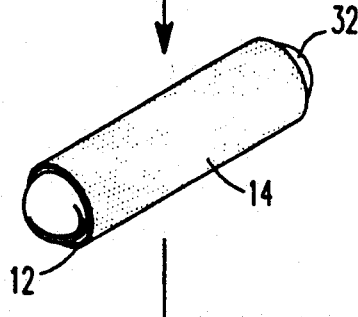
Figure 4:
Figure 4:
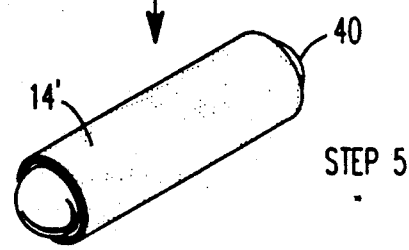
Figure 4:
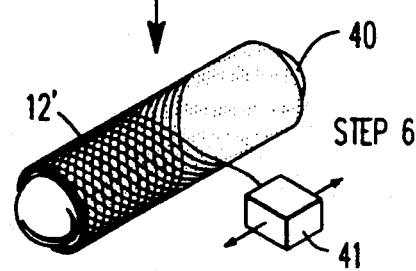
Figure 4:
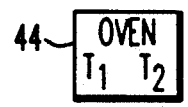
Figure 4:
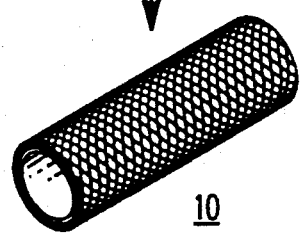

Fabrication of the composite laminate, in accordance with the present invention, is illustrated in one embodiment in FIG. 4. In step 1, the constraining layer members 16 are fabricated from one or more filament layers 16a to 16N impregnated with a resin matrix having a certain gelation temperature at which the resin matrix is tacky or partially staged prior to a final curing.

In step 2, the first or inner load-bearing composite member is fabricated such as by filament-winding on a mandrel 40, in conjunction with filament-winding apparatus 41. In accordance with the present invention, the resin matrix used for the load-bearing member has a gelation temperature which is different and, in the present embodiment, lower than the gelation temperature of the resin matrix used for the composite constraining layer members 16.

In step 3, the first viscoelastic damping layer 14 is applied over the load-bearing member 12. The viscoelastic damping layer has a slight tack so that when wrapped around the tube 12, it will stick to itself and remain in place. Alternatively, or in addition, the ends of the damping layer 14 may be taped down and subsequently cut off after fabrication of the composite laminate structure. No adhesive is required or applied for this step.

In step 4, the constraining layer members are placed on the first viscoelastic damping layer 14 in a manner so as to leave gaps between the applied layers. The resin matrix of the constraining layer members 16 is somewhat tacky, and will adhere to the viscoelastic damping layer 14 without the requirement for clamping members or adhesive bonding.

For damping operation, the constraining layer member 16 must move independently of one another during vibration; accordingly, these members must not be touching one another. The resin matrix for the constraining layer members may be one which does not flow during curing, so as to reduce the possibility of the constraining layer members adhering to one another. Alternatively, and as illustrated, if the resin matrix will flow during cure, a plurality of spacer strips 20 will be inserted in the gaps between the constraining layer members. The spacer strips 20 must be compressible, compliant, not absorb any resin, and survive in an elevated temperature cure cycle.

In step 5, the second viscoelastic damping layer 14 is applied in a manner similar to the first layer 14; thereafter, the second or outer load-bearing member 12' is applied by filament-winding apparatus 41 using a resin matrix similar to that used for the fabrication of load-bearing member 12.

The structure thus formed is then placed in an oven 44, as indicated in step 7, and cured in a single cure cycle wherein the resin matrix of the inner and outer load-bearing members 12, 12' harden at their gelation temperatures $T_1$ and, thereafter, start to cure as the temperature is increased to the gelation temperature $T_2$ of the resin matrix of the constraining layer members. As indicated in step 8, the cured composite laminate structure may be removed from the mandrel and may be prepared for use.

A composite laminate, in accordance with the teachings of the present invention, may be fabricated utilizing AS4 graphite fiber, produced by Hercules Inc., for the filament reinforcing of the constraining layer members 16 as well as for the filament reinforcing of the load-bearing members 12, 12'. The resin matrix for the load-bearing members may be a formulation of 100 parts by weight of EPON 826, an epoxy resin produced by Shell Corp. and 36 parts by weight of Jeffamine T403, a curing agent, produced by Texaco Chemical Company, with the formulation having a gelation temperature of approximately 150° F. The constraining layer resin matrix may be 3501-6, produced by Hercules Inc., with a gelation temperature of approximately 300° F., and non-reactive at the lower temperature when the other resin matrix is gelling. Viscoelastic damping layers 14, 14' may be ISD-110, produced by the 3M Company, and which can withstand temperatures of 380° F.

Figure 5:
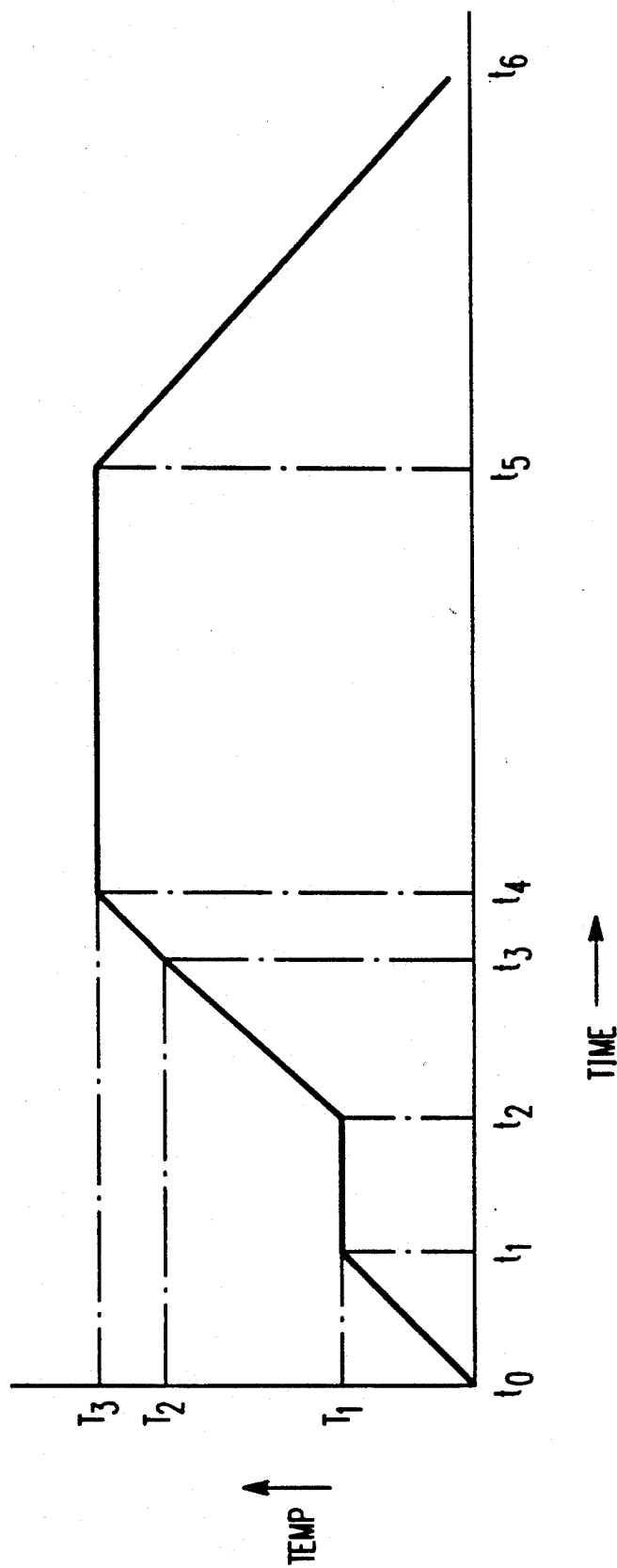
FIG. 5 is a graph illustrating the temperature profile which may be utilized in the cure process, in accordance with the present invention.

A temperature profile of the cure cycle is illustrated in FIG. 5. The temperature of the oven is increased up to the first gelation temperature $T_1$. To ensure sufficient gelation, the temperature may be held, for example, for a period of hours, from time $t_1$ until time $t_2$, with the temperature thereafter being increased at a rate of, for example, 1° F. to 5° F. per minute through the second gelation temperature $T_2$ at time $t_3$. Thereafter, the temperature is increased to a cure temperature $T_3$ at time $t_4$ and held for a period of time measurable in hours to complete the cure of the composite laminate structure. Thereafter, cool down occurs from $t_5$ to $t_6$.

With the two different resin matrices utilized, one resin matrix will not start to flow until the other resin matrix has flowed and become hardened. When the load-bearing laminate resin matrix gels prior to the constraining layer resin matrix, the uncured constraining layer resin matrix is encased within the wall of the composite laminate 10. At this time, the viscoelastic damping layers bond to the load-bearing members, thus eliminating the need to apply an adhesive during the fabrication process. After temperature $T_1$ and time $t_2$, the resin matrix of the constraining layer members begins to soften, flow and cure, thus completing the bond between the viscoelastic damping layers and the constraining layer members.

Accordingly, there has been provided a fabrication technique for a composite laminate with internal constraining layers, which eliminates the requirement for precuring the constraining layer and machining to size. The process further eliminates the requirement for adhesively bonding the viscoelastic damping layers, and curing is accomplished in one cure cycle.

Although the invention has been described with a degree of particularity, it is to be understood that modifications may be readily made. For example, the process of fabricating the constraining layer members, illustrated as step 1 in FIG. 4, could occur prior to, concurrent with, or even subsequent to the fabrication of the first load-bearing member 12, as in step 2. For convenience, the resin matrices of the outer and inner load-bearing members 12, 12' are the same; however, they could be different, thus giving rise to a temperature profile with three plateaus instead of two, as in FIG. 5. Although a right circular cylindrical member has been illustrated, other shapes are possible, and more than one internal constraining layer and damping sandwich may be utilized.

What we claim is:

1. A method of forming a composite laminate having an internally damped constraining layer, comprising the steps of:
   a. forming a plurality of uncured composite constraining layer members each of a filament reinforced resin matrix having a certain gelation temperature;
   b. forming a first composite load-bearing member of a filament reinforced resin matrix having a certain gelation temperature different than the gelation temperature of said resin matrix of said constraining layer members;
   c. applying a first viscoelastic damping layer to said first composite load-bearing member prior to curing;
   d. applying said constraining layer members over said first viscoelastic layer in a predetermined pattern which leaves gaps between said applied layers, and prior to curing, while said resin matrix of said constraining layer members is still tacky;
   e. applying a second viscoelastic damping layer over said constraining layer members;
   f. forming a second composite load-bearing member over said second viscoelastic damping layer and being of a filament reinforced resin matrix having a gelation temperature the same as the gelation temperature of said resin matrix of said first composite load-bearing member;
   g. curing the thus fabricated structure by placing it in an oven and increasing the temperature thereof sequentially through the gelation temperatures of said resin matrices until said composite laminate is cured;
   h. the gelatin temperature of said resin matrix of said constraining layer members being higher than that of said resin matrices of said load-bearing members so that the resin matrices of said load-bearing members are completely gelled before the resin matrix of said constraining layer members begin gelation.

2. A method of forming a composite laminate having an internally damped constraining layer, comprising the steps of:
   a. forming a plurality of uncured composite constraining layer members each of a filament reinforced resin matrix having a certain gelation temperature;
   b. forming a first composite load-bearing member of a filament reinforced resin matrix having a certain gelation temperature different than the gelation temperature of said resin matrix of said constraining layer members;
   c. applying a first viscoelastic damping layer to said first composite load-bearing member prior to curing;
   d. applying said constraining layer members over said first viscoelastic layer in a predetermined pattern which leaves gaps between said applied layers, and prior to curing, while said resin matrix of said constraining layer members is still tacky;
   e. applying a second viscoelastic damping layer over said constraining layer members;
   f. forming a second composite load-bearing member over said second viscoelastic damping layer and being of a filament reinforced resin matrix having a gelation temperature the same as the gelation temperature of said resin matrix of said first composite load-bearing member;
   g. curing the thus fabricated structure by placing it in an oven and increasing the temperature thereof to the lower of the gelation temperatures of the resin matrices;
   h. maintaining said lower temperature for a predetermined period of time to complete the gelation; and
   i. thereafter increasing the temperature to the higher gelation temperature.

3. A method according to claim 2, which includes the step of:
   a. maintaining said first named temperature for a period of hours.

4. A method according to claim 2, which includes the step of:
   a. increasing the temperature to a value above the higher of said gelation temperatures to cure the composite laminate.

5. A method according to claim 2, which includes the step of:
   a. raising said temperature from said lower to said higher temperature at a rate of approximately 1 to 5 degrees F per minute.

* * * * *